US007937624B2

(12) United States Patent
Qing et al.

(10) Patent No.: US 7,937,624 B2
(45) Date of Patent: May 3, 2011

(54) METHOD FOR HANDLING A DETECTED ERROR IN A SCRIPT-BASED APPLICATION

(75) Inventors: Richard Qing, Ottawa (CA); Laura Doktorova, Mississauga (CA); Kamen B. Vitanov, Mississauga (CA); Viera Bibr, Kilbride (CA); Michael Shenfield, Richmond Hill (CA); Brindusa L Fritsch, Toronto (CA); David DeBruin, Guelph (CA); Bryan R Goring, Milton (CA)

(73) Assignee: Research In Motion Limited, Waterloo, Ontario (CA)

( * ) Notice: Subject to any disclaimer, the term of this patent is extended or adjusted under 35 U.S.C. 154(b) by 477 days.

(21) Appl. No.: 11/405,639

(22) Filed: Apr. 18, 2006

(65) Prior Publication Data
US 2006/0248406 A1 Nov. 2, 2006

Related U.S. Application Data

(60) Provisional application No. 60/672,083, filed on Apr. 18, 2005.

(51) Int. Cl.
*G06F 11/00* (2006.01)

(52) U.S. Cl. ............................. 714/38; 714/48

(58) Field of Classification Search ................ 714/2, 48, 714/38
See application file for complete search history.

(56) References Cited

U.S. PATENT DOCUMENTS

| 5,628,016 | A | 5/1997 | Kukol | |
|---|---|---|---|---|
| 6,269,460 | B1* | 7/2001 | Snover | 714/48 |
| 6,542,868 | B1* | 4/2003 | Badt et al. | 704/270 |
| 6,701,514 | B1* | 3/2004 | Haswell et al. | 717/115 |
| 7,283,993 | B2* | 10/2007 | McArdle | 707/3 |
| 7,305,689 | B2* | 12/2007 | Netsu et al. | 720/718 |
| 7,395,455 | B2* | 7/2008 | Nash et al. | 714/36 |
| 7,412,626 | B2* | 8/2008 | Wood et al. | 714/38 |
| 2002/0029299 | A1 | 3/2002 | Kappel et al. | |
| 2003/0167421 | A1 | 9/2003 | Klemm | |
| 2004/0078667 | A1 | 4/2004 | Salem | |
| 2004/0128586 | A1 | 7/2004 | Bahr et al. | |
| 2004/0230962 | A1 | 11/2004 | Ogasawara | |
| 2005/0262472 | A1 | 11/2005 | Wood et al. | |
| 2007/0268889 | A1* | 11/2007 | Heutschi et al. | 370/352 |

FOREIGN PATENT DOCUMENTS

WO 00/46665 A2 8/2000

OTHER PUBLICATIONS

URL:http://bugs.php.net/bug.php?id=31745> [retrieved on May 6, 2009], p. 1-3.
Dony C Ed, Knafl G Institute of Electrical and Electronics Engineers; Improving Exception Handling with Object-Orientated Programming, Proceedings of the International Computer Software and Applications Conference. Chicago, Oct. 31-Nov. 2, 1990, Washington, IEEE. Comp. Soc. Press, US, vol. Conf. 14, Oct. 31, 1990, pp. 36-42, XP000223580.
International Search Report, PCT/CA2006/000623 issued Jul. 5, 2006.
International Preliminary Report on Patentability, PCT/CA2006/000623 issued Sep. 4, 2007.

(Continued)

*Primary Examiner* — Philip Guyton

(57) ABSTRACT

A method is disclosed for handling an error in a script-based application, the method comprising detecting an error in the script-based application, the detecting comprising identifying the error and handling the detected error in accordance with a predetermined error-handling procedure suitable for the identified error.

20 Claims, 6 Drawing Sheets

OTHER PUBLICATIONS

Written Opinion of the International Searching Authority, PCT/CA2006/000623 issued Aug. 6, 2006.

Mytton "Create your own PHP errorhandling class" Dec. 6, 2004, www.olate.co.uk/articles/249.

* cited by examiner

METHOD FOR HANDLING A DETECTED ERROR IN A SCRIPT-BASED APPLICATION

CROSS-REFERENCE TO RELATED APPLICATIONS

This application is based on, and claims benefit of 35 U.S.C. §119(e) of Provisional Patent Application No. 60/672,083 filed Apr. 18, 2005, which is hereby incorporated by reference.

FIELD OF THE ART

This application relates generally to wireless communications and wireless communications devices and, in particular, to methods for handling detected errors in script-based applications.

BACKGROUND OF THE ART

The acceptance of wireless devices as a preferred personal communications medium has created a growing demand for such devices. Users of such devices also increasingly expect more functionality and a broader range of services to be made available through such devices. Not only is there a demand for more functionality, there is also a demand for faster response times and more efficient access to remote services.

A major challenge is faced in exposing wireless devices to complex data sources, such as Web services, due to the size and complexity of the data structures communicated from such sources and other application development, communication and processing requirements. One type of application which addresses many of theses concerns is a component-based application (CBA) comprising various definitions (data, message, user interface/screen, script etc.) for instructing a runtime environment provisioned on a wireless device. The wireless device may communicate with the data source via a stateful proxy gateway relatively unburdened by the wireless device's processing and storage restrictions which can map communications and handle complex data structures and protocols demanded by the data sources.

Script components developed for the wireless device can detail various business and other logic for communicating with the remote data sources. An application which relies on script functions to conduct a majority of its business logic may be referenced as a script-based application (SBA).

A customizable error-handling (CEH) mechanism, which exposes runtime errors to an application, offers a way for an application to provide its own runtime error-handling logic. For instance, traditional object-oriented languages such as C++ and Java™, as well as the scripting language ECMAScript applies try blocks, catch blocks and (for Java and ECMAScript) finally blocks in order to provide their customizable error-handling feature.

Unfortunately, such a feature in script languages such as ECMAScript (Standard ECMA-262) and JavaScript™ is not perfectly supported in the sense that error objects of ECMAScript can not be inherited to introduce user-defined error objects; instead, an ECMAScript developer has to create his/her own script constructor functions to do this, which is tedious and inefficient and therefore, is not suitable for a fully-fledge business application. Moreover, for each user-defined type of error, a new error object has to be introduced, which is an inefficient "heavy-way" for a wireless application to handle errors. Finally, in a component-based application (CBA), script functions belong just to one type of component of an application, i.e. a script function component, which undertakes the majority of workflow tasks of the application; however, a runtime error can occur not only from script functions, but also from other structural components of component-based application, such as message components. For example, an error can occur when receiving messages because of overflow of an incoming message queue of the application, or the incoming message itself is just an indication of an error that happened in the remote server, which has to be sent to a wireless device. Based on the above considerations, the existing error-handling of scripting languages is not suitable for customizable error-handling in a script-based application running in a mobile device.

The skilled addressee will appreciate that not being able to provide a customizable error-handling mechanism is a great drawback in the case of a script-based application running in a mobile device or in the case of a desktop processing unit since many script-based applications run on these devices.

There is a need for a method and apparatus that will overcome at least one of the above-identified drawbacks.

Features of the present application will be apparent from review of the disclosure, drawings and description of the present application below.

DESCRIPTION OF THE DRAWINGS

In order that the invention may be readily understood, embodiments of the present application are illustrated by way of example in the accompanying drawings.

Further details of the present application and its advantages will be apparent from the detailed description included below.

DETAILED DESCRIPTION

According to an aspect of the present application, there is provided a method for handling an error in a script-based application, the method comprising detecting an error in the script-based application, the detecting comprising identifying the error and handling the detected error in accordance with a predetermined error-handling procedure suitable for the identified error.

According to another aspect of the present application, there is provided a method for handling errors comprising: provisioning a runtime environment which executes applications comprising component definitions with computer-executable code for: accepting as input at least one component definition describing user-defined errors and a script function for error-handling to provide customized handling of such errors; and detecting user-defined errors and invoking the script function for error-handling in response to user-defined errors detected.

According to yet another aspect of the present application, there is provided a device for handling errors comprising: a runtime environment which executes applications comprising component definitions with computer-executable code for: accepting as input at least one component definition describing user-defined errors and a script function for error-handling to provide customized handling of such errors; and detecting user-defined errors and invoking the script function for error-handling in response to user-defined errors detected.

In the following description of the embodiments, reference to the accompanying drawings is by way of illustration of an example by which the invention may be practiced. It will be understood that other embodiments may be made without departing from the scope of the present application.

Figure 1:
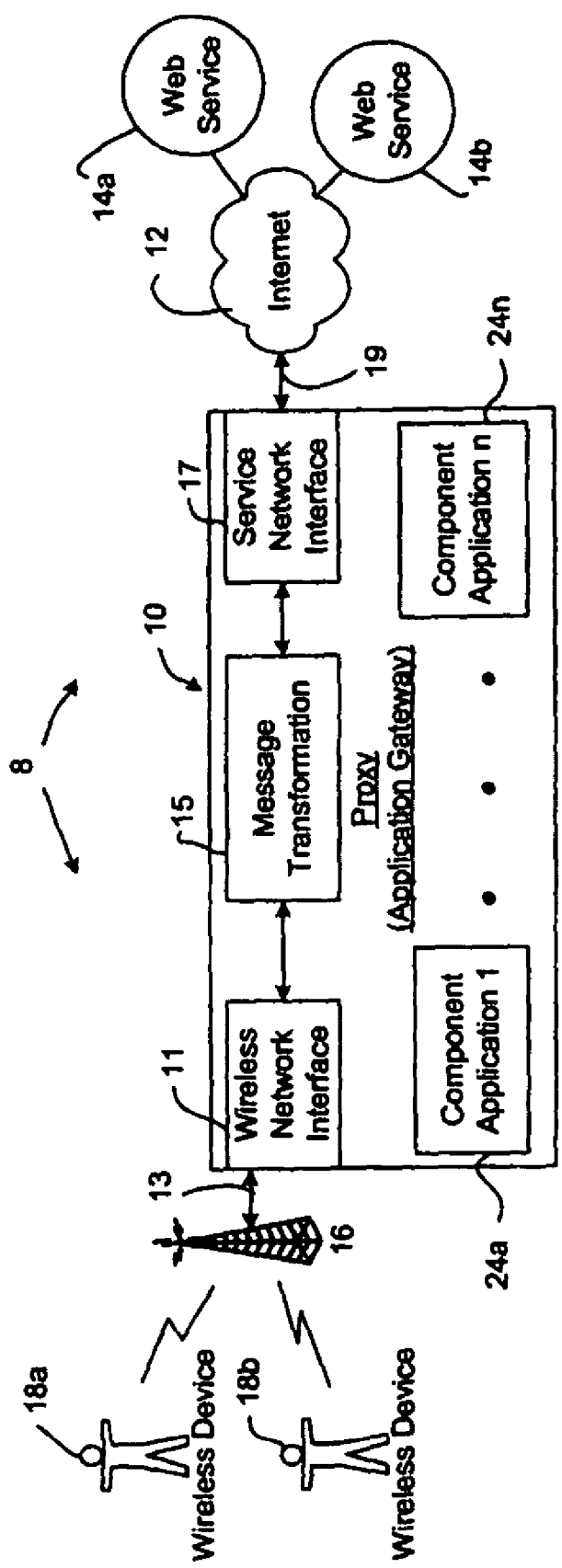
FIG. 1 is a block diagram which shows an embodiment in which a method for handling a detected error in a script-based application according to an embodiment of the present application may be advantageously used.

Referring to FIG. 1, there is shown an embodiment of a system wherein a method for handling an error in a script-based application according to an embodiment of the present application may be advantageously used.

FIG. 1 is a block diagram of a network 8 in which wireless device users 18a, 18b operate wireless devices to send Web service request messages via a public domain carrier 16 to a stateful proxy which in an embodiment is an application gateway 10. The application gateway 10 forwards the Web service request messages through a service network such as the Internet 12 to an appropriate Web service 14a, 14b. The messages are processed by the appropriate Web service 14a, 14b and returned through the Internet 12 to the application gateway 10. The public domain carrier 16 forwards the response messages to the wireless device 18a, 18b which processes the response and displays, as applicable, response content to the wireless device users.

The application gateway 10 supports a wireless network interface 11 having a link 13 to the wireless network 12. A message transformation function 15 receives messages from the wireless network interface 11 and processes the messages before forwarding the messages to a service network interface 17. The service network interface 17 has a link 19 to the service network 12 (the Internet, for example) over which it forwards the messages to an appropriate Web service 14a, 14b.

In accordance with an embodiment of the present application, the application gateway 10 is provisioned with a plurality of component-based applications 24a, 24n which configure the gateway 10 for processing the various messages. Gateway 10 may also provision the wireless devices 18a, 18b with portions of the component-based applications 24a, 24n to enable the devices 18a and 18b to access the Web services 14a and 14b via the gateway 10.

The plurality of user devices 18a, 18b comprise devices that are adapted to process at least data and may include voice and data processing functions. In an embodiment, shown in FIG. 1, the plurality of user devices 18a, 18b are wireless mobile devices. It should be appreciated that various types of devices may be used such as Personal Digital Assistants (PDAs), smart phones, etc. In an embodiment, the plurality of user devices 18 comprises Blackberry™ devices which are manufactured by Research In Motion Limited.

Figure 2:
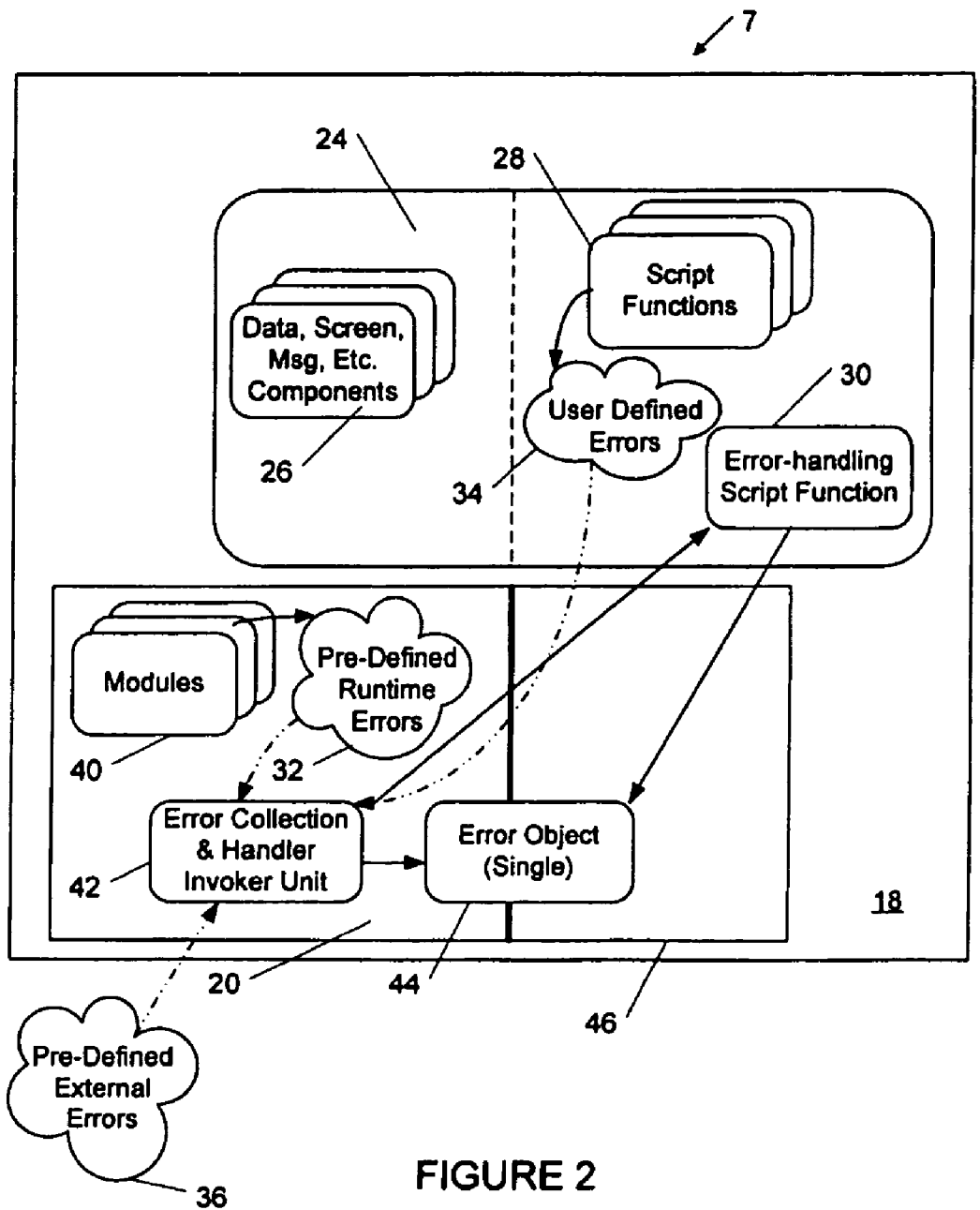
FIG. 2 is a block diagram which shows an embodiment for practicing the method for handling of a detected error in a script-based application according to an embodiment of the present application.

Now referring to FIG. 2, there is shown an embodiment of a system 7 for handling an error in a script-based application according to an embodiment of the present application.

The system 7 comprises a wireless device 18, namely a programmable computing device having a processor and memory for storing instructions and data to configure the processor (details not shown). Such instructions and data may define a runtime environment 20 comprising modules 40 including an error collection and handler invoker unit 42 for providing basic services and resources to execute component-based applications, for example, script-based application 24. The script-based application 24 comprises a plurality of components (26, 28 and 30), namely data, screen, message and other components 26, and script functions 28, of which error-handling script function 30 is an example. An error object 44 (data structure) provides an efficient mechanism with which to pass error information between the runtime environment 20 and a script runtime environment 46 of device 18 for executing script functions 28 such as error-handling script function 30. Error object 44 is a single object or single object per thread (for multiple-thread execution environments) and is thus a reusable and efficient storage and processing construct.

Various errors may be handled in accordance with the embodiment of system 7. Pre-defined runtime errors 32 may be occasioned (i.e. thrown during erroneous operation) by various runtime modules 40. Pre-defined external errors 36 may be observed for errors in the operation of a remote server/service with which the script-based application (or other instructions) configure device 18 to communicate. Advantageously, user-defined errors 34 may be specified and thrown by script functions 28 and handled in accordance with the customizable error-handling techniques described herein. Script runtime environment 46 may extend particular script functions with a common system function such as System.throws(errorCode:Integer) to throw a user-defined error from a script. This shared function reduces a component-based applications developer's tasks and permits common and robust error-handling.

Each individual error is typically associated with an error code (EC), and similar type errors may be assigned error codes which are grouped for easier processing (e.g. pre-defined runtime errors may have codes 00-99 while pre-defined external errors may have codes 100-199). An error code is useful as an index or other association to an error definition which may include a description and other information. Pre-defined errors are system-specific and can occur when running any script-based applications. They are defined in advance (that is typically by the developer/provider of runtime environment 20 and other supporting infrastructure for use with component-based application developed by others) and their error codes are reserved. User-defined errors are associated with specific script-based applications, and a script-based application developer can define his/her own error codes and corresponding errors, which are defined at the development time of the script-based application.

Error collection and handler invoker unit 42 receives or collects an error (external system errors 36, internal system errors 32 and user-defined script-based application errors 34), identifies it and determines how to handle the error, e.g. by invoking the error-handling script function, if applicable, for user-defined errors 34. Some errors may not need to be exposed to a user of device 18 or others. Certain internal errors may be better left unexposed. As such no script function need be invoked. Pre-defined errors (internal or external) may be internally delegated to the error collection module, i.e. in accordance with an error-delegation mechanism available from an underlying (operating) system or within the runtime environment.

In an embodiment, the error-collecting and handler invoker unit 42 may be implemented to collect runtime exceptions by using an exception-delegation mechanism of the implementing language. In particular, for an error which occurs in a remote server/service that an application communicates with, and if the error should be handled by the application, the messaging module of the application could extract the error from a message upon its receipt, and hand it over as an event to the error-collecting and handler invoking unit 42, which will have registered as a listener of that specific event. Alternatively, the error-collecting and handler-invoker unit 42 may be implemented as a pure event listener or just solely based on the error delegation mechanism of the underlying implementing language.

For errors to be handled in accordance with customizable operations, i.e. user-defined errors 34, error-collecting and handler-invoker unit 42 updates error object 44 with the latest error code and description, etc. The error-handling script function 30 is invoked. Error object 44 is owned by runtime environment 20 such that it (unit 42) has privileges to read/write/update error object 44 while limited access is provided to script runtime environment 46 whereby error-handling script function 30 has only read access and other scripts of script-based application have no access.

The error-handling script function 30 is used for handling an error according to a procedure as further explained below. In an embodiment, the error-handling script function 24 is just another script function in a script-based application, which can be called by the runtime environment where the application resides (i.e. a call-back function). The script function would preferably be generated by an IDE for the script-based application, and based on the generated version, the developer can customize with his/her error-handling logic as the application business logic requires, e.g. automatically report a bug of the application to a remote server when a certain error occurs.

Figure 3:
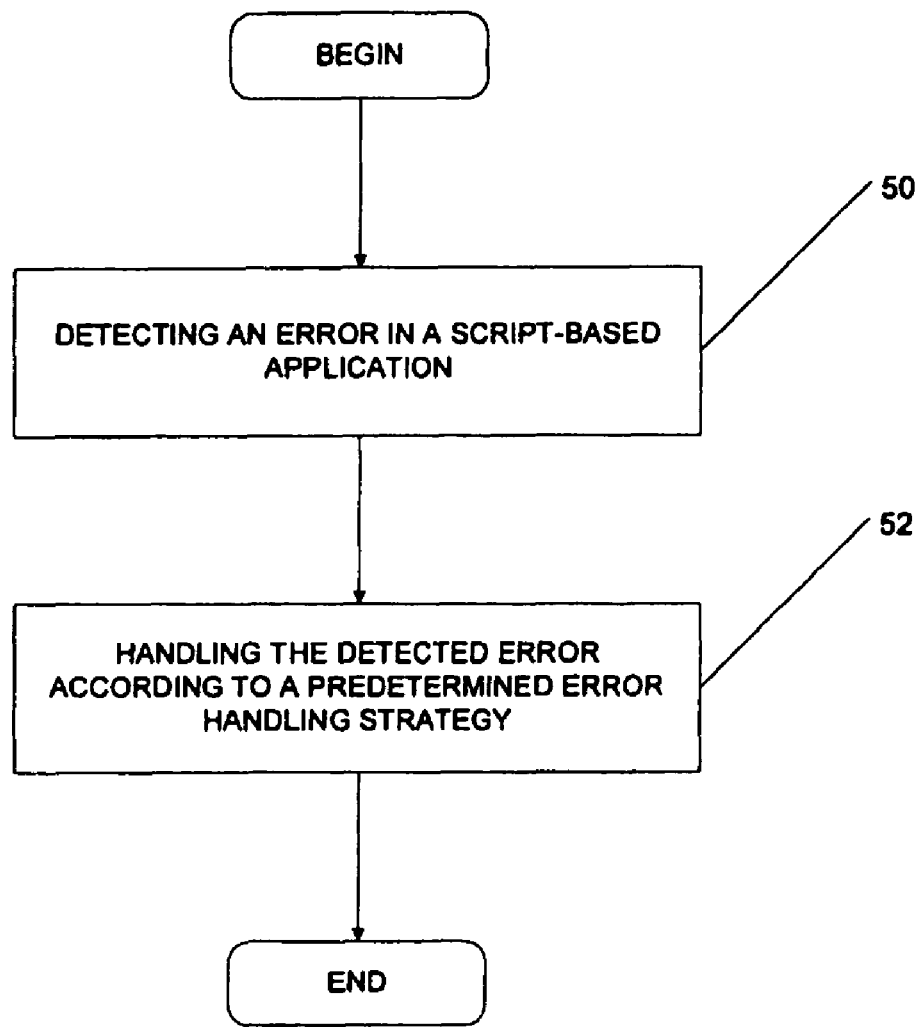
FIG. 3 is a flowchart which shows an embodiment of a method for handling a detected error in a script-based application according an embodiment of the present application. According to a first step, an error is detected while according to a second step the detected error is handled according to a predetermined error-handling strategy.

Referring to FIG. 3, there is shown an embodiment of the method for handling a detected error in a script-based application.

According to step 50 an error is detected in a script-based application. In an embodiment, the error is detected using the error-collecting unit 42 disclosed in FIG. 2.

According to step 52, the detected error is handled according to a predetermined error-handling strategy or procedure. The skilled addressee will appreciate that in some cases, it might be pertinent to perform a different operation in response to the error detected.

Figure 4:
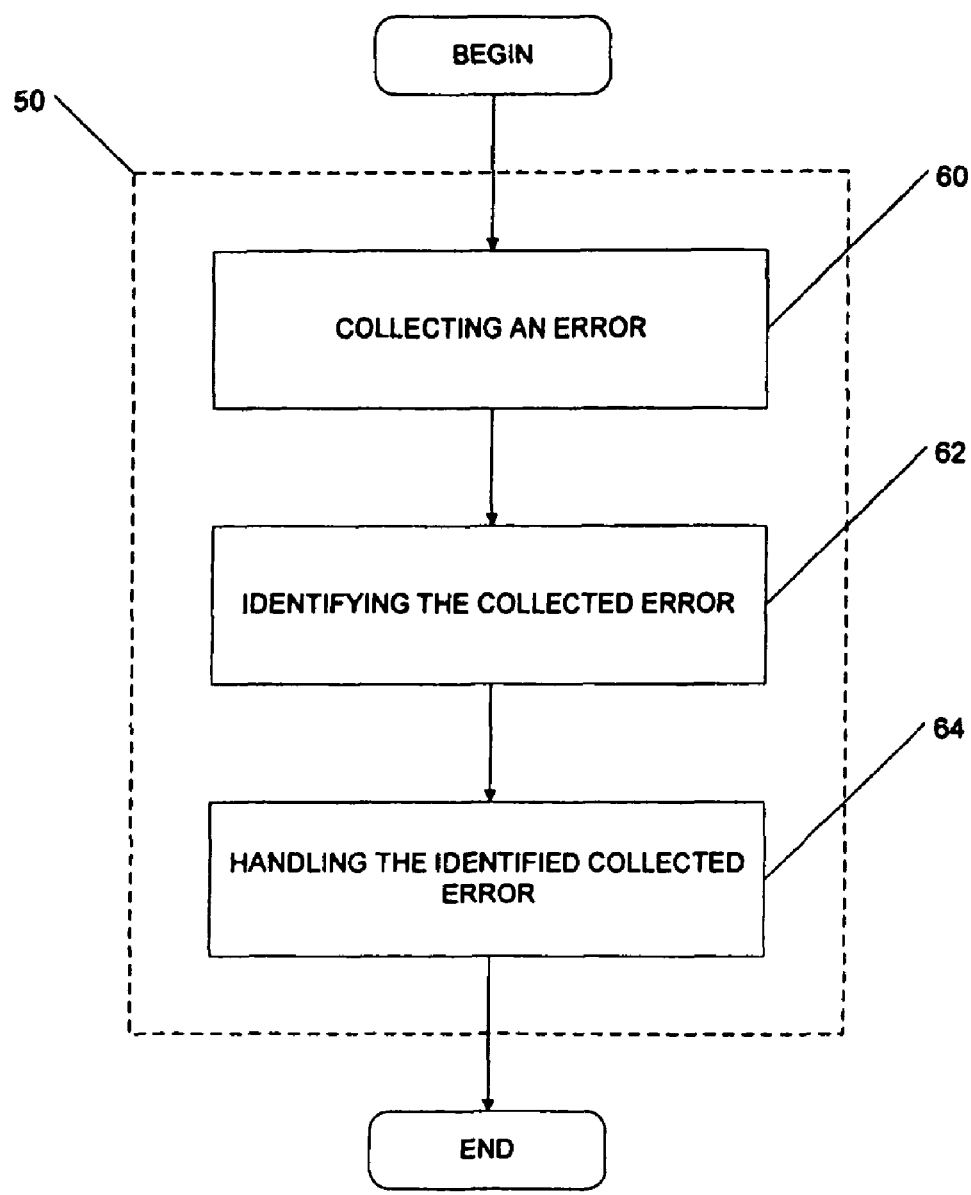
FIG. 4 is a flowchart which shows an embodiment for detecting an error in a script-based application.

Now referring to FIG. 4, there is shown an embodiment for detecting an error in a script-based application.

According to step 60, an error is collected. In an embodiment, the error is collected using the error-collecting unit 42.

According to step 62, the collected error is identified. In an embodiment, the collected error is identified using the error-collecting unit 42.

According to step 64, the identified collected error is handled in accordance with a type of error. Predefined system errors may be handled by the underlying system (runtime system 20 or an operating system (not specifically shown). User-defined errors are handled using an invocation and information passing mechanism, for example including an efficient single reusable structure error object 44.

Figure 5:
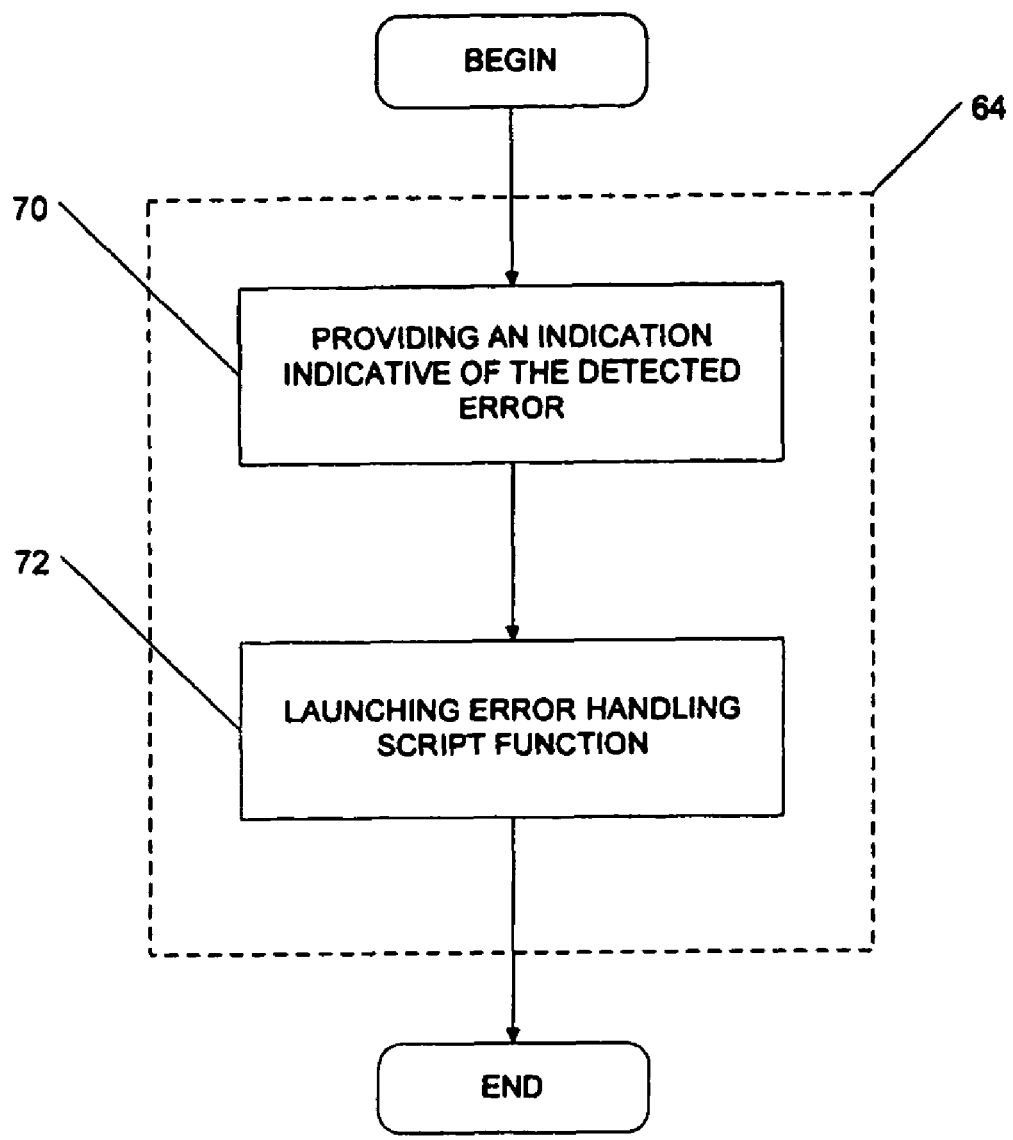
FIG. 5 is a flowchart which shows an embodiment for managing an identified error.

Now referring to FIG. 5, there is shown an embodiment for handling the identified collected error.

According to step 70, an indication indicative of the error detected is provided (e.g. error code, description and other information). In an embodiment, the indication indicative of the error detected is provided to mechanism error object 44.

According to step 72, error-handling script function 30 is invoked or scheduled for invocation. Below is an pseudocode representation of a skeletal script:

```
Function onError( ) {
    Switch (Error.code) {
        Case Error.ER__1:
            :
            break;
            :
            Case Error.USER__DEFINED__ER___1:
            :
            break;
        default:
            break;
    }
}
```

The signature of a script function is predefined to assure one entry-point for error-handling procedure. Error-handling script function 30 can be hand-written or generated by a script-based application development studio (e.g. IDE). As aforementioned, error-handling script function 30 is the only script function 28 that can read (not write) error object 44 in script runtime environment 46.

Figure 6:
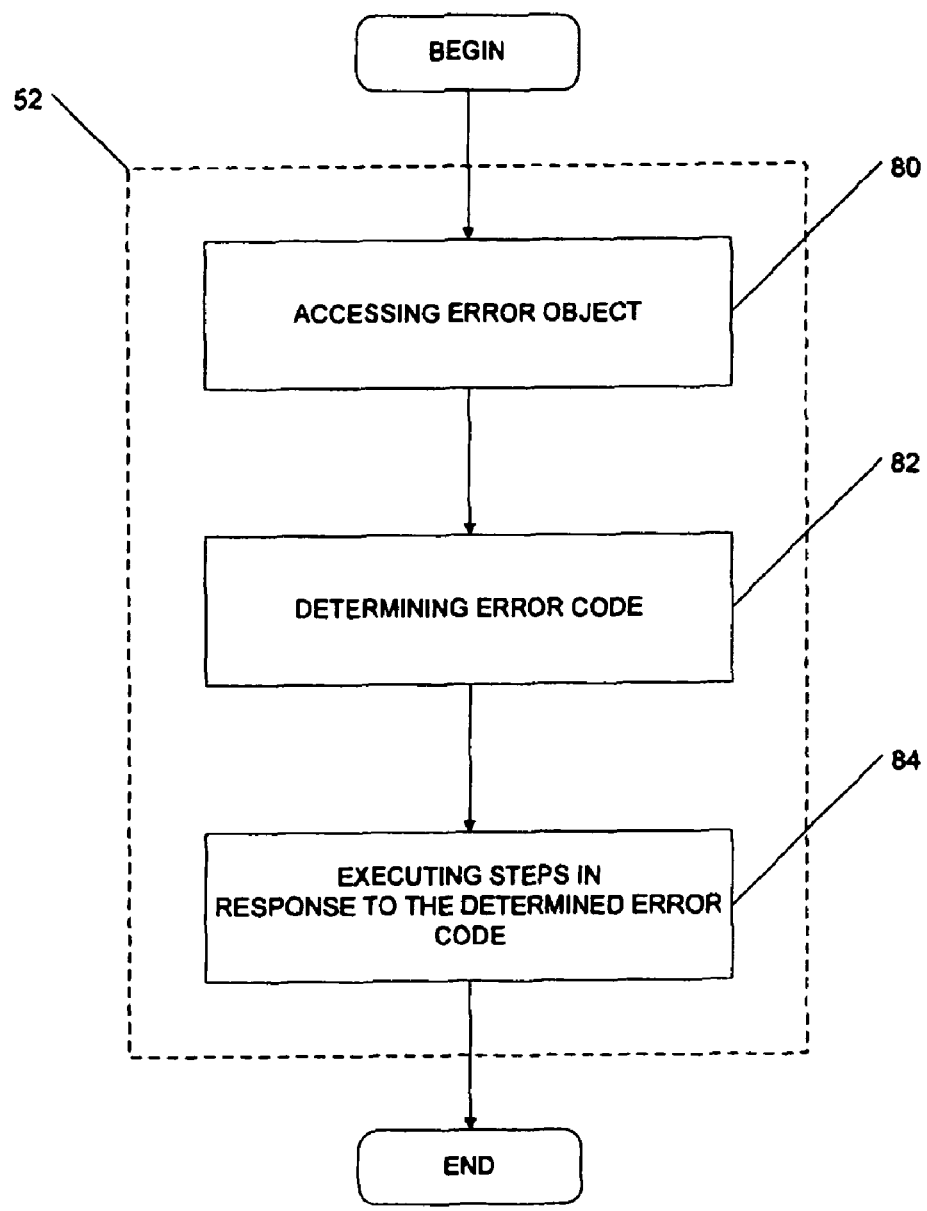
FIG. 6 is a flowchart which shows an embodiment for handling the detected error according to a predetermined error-handling strategy.

Now referring to FIG. 6, there is shown how the detected error is handled according to a predetermined error-handling procedure.

According to step 80, error object 44 is accessed. More precisely, the error-handling script function 30 accesses error object 44 and determines (step 82) the error code identifying the error.

According to step 84, steps to perform in accordance with error code indication are executed. Steps may include notifying a user of device 18 via a user interface therefor (e.g. screen components 26) for display or emitting a sound on output device components (not shown) of device 18.

While illustrated in the block diagrams as groups of discrete components communicating with each other via distinct data signal connections, it will be understood by those skilled in the art that embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment.

It should be noted that the present invention can be carried out as a method, can be embodied in a system, a computer-readable medium or an electrical or electro-magnetic signal.

Although the above description relates to a specific embodiment as presently contemplated by the inventor, it will be understood that the invention in its broad aspect includes mechanical and functional equivalents of the elements described herein.

We claim:

1. A method for handling an error in a script-based application, said method comprising:
    detecting an error in said script-based application, said detecting comprising collecting the error, identifying said error and where said collected error is a predefined system error, handling said collected error using an underlying system and if the error is a user defined error:
    updating a reusable error object with information associated with said error;
    accessing said reusable error object to determine an error code indicative of said error; and
    invoking a single script function for error-handling to handle said error in accordance with a predetermined error-handling procedure in response to the user defined error detected, the script function being provided with the information associated with said error from the reusable error object; whereby the script function has only read access to the reusable error object and other script functions of said script-based application have no access to the reusable error object.

2. The method as claimed in claim 1, wherein said invoking of said error-handling script function comprises scheduling for invocation said error-handling script function.

3. The method as claimed in claim 1, wherein said error-handling script function was generated by a script-based application.

4. The method as claimed in claim 1, wherein said handling of the detected error in accordance with a predetermined error-handling procedure further comprises executing at least one step in accordance with said determined error code.

5. The method as claimed in claim 4, wherein said executing of said at least one step comprises at least one of notifying a user of a corresponding device and emitting a sound on said corresponding device.

6. The method of claim 1 wherein said reusable error object is a data structure and said updating said reusable error object with information associated with said error comprises updating said reusable error object with an error code and a description of said error.

7. The method of claim 6 wherein said accessing said reusable error object to determine an error code indicative of said error comprises reading an error code from said reusable error object.

8. The method of claim 6 wherein said handling said collected error using an underlying system comprises handling said collected error using at least one of a runtime system and an operating system.

9. The method of claim 1, wherein the script-based application comprises a JavaScript application or an ECMAScript application.

10. A method for handling errors comprising:
provisioning a runtime environment which executes applications comprising component definitions with computer-executable code for:
accepting as input at least one component definition describing user-defined errors and a single script function for error-handling to provide customized handling of such errors;
detecting an error said detecting comprising collecting the error, identifying said error and where said collected error is a predefined system error, handling said collected error using an underlying system and if the user is a user defined error:
invoking a reusable error object;
updating the reusable error object with information associated with said error;
using said reusable error object to provide error information to said script function; and
reading an error code from said reusable error object and invoking the script function for error-handling in response to the user-defined error detected; whereby the script function has only read access to said reusable error object and other script functions of said script-based application have no access to said reusable error object.

11. The method of claim 10 wherein said reusable error object is a data structure and wherein said using said reusable error object to provide error information to said script function comprises updating said reusable error object with an error code and a description of said error.

12. The method of claim 9 further comprising using one reusable error object per thread in a multi-thread environment.

13. The method of claim 9, wherein the applications comprise JavaScript or ECMAScript applications.

14. A device for handling errors in a script-based application comprising:
a tangible computer-readable medium having a runtime environment stored thereon which executes applications comprising component definitions with computer-executable code for:
accepting as input at least one component definition describing user-defined errors and a single script function for error-handling to provide customized handling of errors;
detecting an error said detecting comprising collecting the error, identifying said error and where said collected error is a predefined system error, handling said collected error using an underlying system and if the error is a user defined error:
invoking a reusable error object;
updating the reusable error object with information associated with said error;
using said reusable error object to provide error information to said script function; and
reading an error code from said reusable error object and invoking the script function for error-handling in response to the user-defined error detected; whereby the script function has only read access to said reusable error object and other script functions of said script-based application have no access to said reusable error object.

15. The device of claim 14, comprising a wireless device and wherein the application configures the wireless device for communication with a remote data source using a stateful proxy gateway.

16. The device of claim 14, wherein the script-based application comprises a JavaScript or ECMAScript application.

17. A wireless communication system comprising:
a device for handling errors in a script-based application comprising a tangible computer-readable medium having a runtime environment stored thereon which executes applications comprising component definitions with computer-executable code for:
accepting as input at least one component definition describing user-defined errors and a single script function for error-handling to provide customized handling of such errors;
detecting an error;
if the error is a user-defined error invoking a reusable error object, updating the reusable error object with an error code associated with the user-defined error,
using said reusable error object to provide error information to said script function and reading the error code from said reusable error object and invoking the script function for error-handling in response to user-defined error detected whereby the script function has only read access to said reusable error object and other script functions of said script-based application have no access to said reusable error object; and
if the error is a pre-defined error, handling the error commonly without invoking the error-handling function; and
a stateful proxy gateway.

18. The system of claim 17, wherein the script-based application comprises a JavaScript or ECMAScript application.

19. A computer-readable medium on which is stored computer-executable instructions for implementing a method for handling an error in a script-based application, said method comprising:
    detecting an error in said script-based application, said detecting comprising collecting the error, identifying said error and where said collected error is a predefined system error, handling said collected error using an underlying system and if the error is a user defined error:
    updating a reusable error object with information associated with said error; and if the error is a user-defined error, updating a reusable error object with information associated with said error;
    accessing said reusable error object to determine an error code indicative of said error; and
    invoking a single error-handling script function to handle the detected error in accordance with a predetermined error-handling procedure suitable for the identified error, the error-handling script function being provided with the information associated with the detected error from the reusable error object, whereby the error-handling script function has only read access to the reusable error object and other script functions of said script-based application have no access to the reusable error object.

20. The computer-readable medium of claim 19, wherein the script-based application comprises JavaScript or ECMAScript application.

* * * * *

UNITED STATES PATENT AND TRADEMARK OFFICE
CERTIFICATE OF CORRECTION

| | | |
|---|---|---|
| PATENT NO. | : 7,937,624 B2 | Page 1 of 1 |
| APPLICATION NO. | : 11/405639 | |
| DATED | : May 3, 2011 | |
| INVENTOR(S) | : Richard Qing et al. | |

It is certified that error appears in the above-identified patent and that said Letters Patent is hereby corrected as shown below:

Column 1, line 33, "...many of theses..." should be --...many of these...--;
Column 5, line 24, "...error-handling script function 24..." should be --...error-handling script function 30...--;
Column 7, claim 8, line 31, "...method of claim 6..." should be --...method of claim 1...--;
Column 8, claim 12, line 1, "...method of claim 9..." should be --...method of claim 10...--;
Column 8, claim 13, line 4, "...method of claim 9,..." should be --...method of claim 10,...--;
Column 9, claim 19, lines 7-11, "...predefined system error, handling said collected error using an underlying system and if the error is a user defined error: updating a reusable error object with information associated with said error; and if the error is a user-..." should be --...predefined system error, handling said collected error using an underlying system; and if the error is a user-...--.

Signed and Sealed this
Twenty-third Day of August, 2011

David J. Kappos
*Director of the United States Patent and Trademark Office*